Jan. 12, 1926. 1,569,306

M. G. ROSENTHAL

ROTARY EXPLOSION ENGINE

Filed August 29, 1923 2 Sheets-Sheet 1

Inventor:
Max G. Rosenthal,
by Robert Burns
Atty.

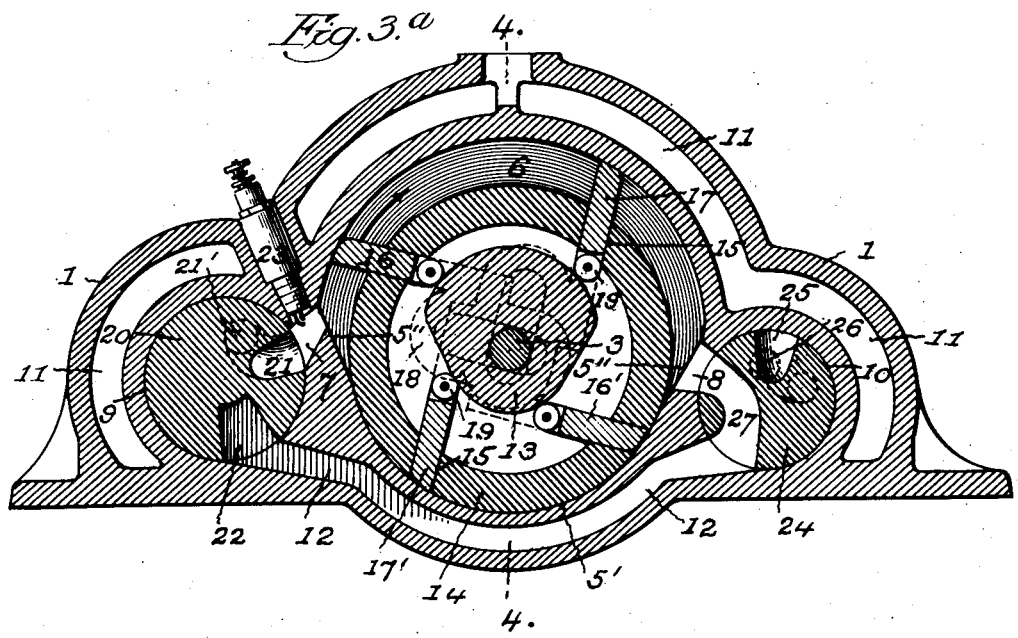
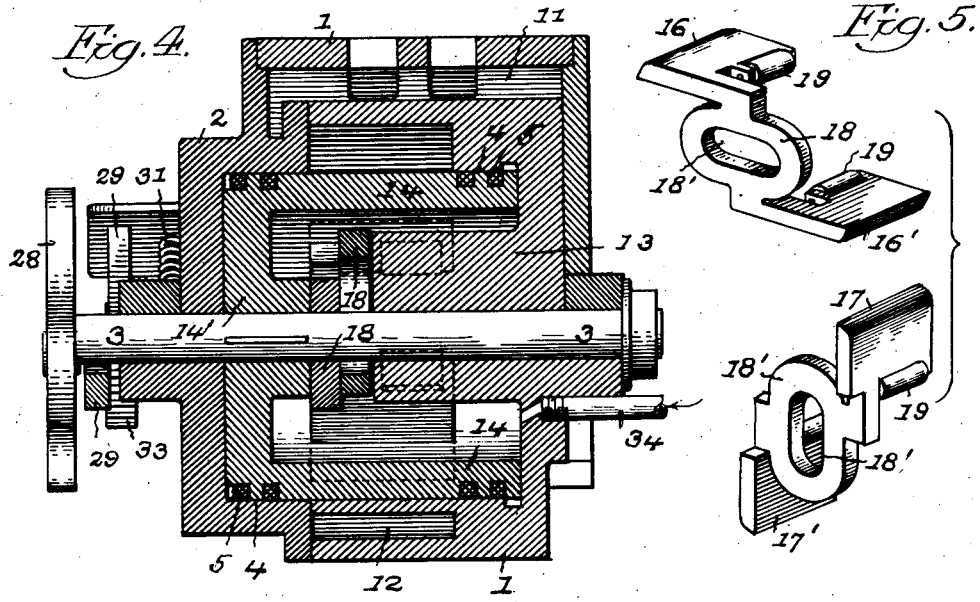 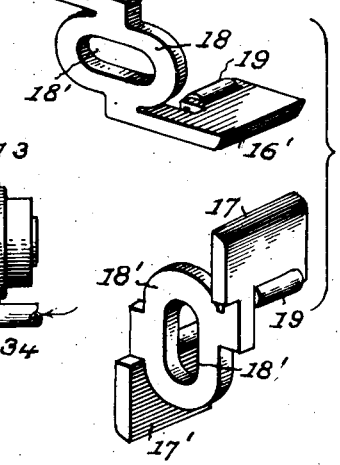

Patented Jan. 12, 1926.

1,569,306

UNITED STATES PATENT OFFICE.

MAX G. ROSENTHAL, OF CHICAGO, ILLINOIS.

ROTARY EXPLOSION ENGINE.

Application filed August 29, 1923. Serial No. 659,924.

*To all whom it may concern:*

Be it known that I, MAX G. ROSENTHAL, a citizen of the United States of America, residing at Chicago, in the county of Cook and State of Illinois, have invented certain new and useful Improvements in Rotary Explosion Engines, of which the following is a specification.

This invention relates to that type of rotary explosion engines in which the stator member is provided with a work chamber of a segmental form, and the rotor member with a series of outwardly shifting piston blades moving in a gas tight manner in said work chamber to attain the operation of the ordinary four cycle type engine. And the present improvement has for its various objects:

To provide a formation and combination of engine parts and mechanism, whereby a four cycle action of the engine, comprising an introduction by suction of an uncompressed charge of gaseous fuel, a compression of said fuel and its storage in a storage passage, a feeding of measured charge of the compressed fuel to attain an explosive or power stroke of the engine, and a final discharge of the exploded fuel and scavenging of the work chamber of the engine, is attained in an effective, simple and durable manner.

To provide a structural formation and combination of the rotor head, the shifting piston blades carried by said head and the cam block which controls the outward movement of said piston blades in the work chamber of the engine, adapted to afford an effective operation of the engine with a minimum extent of initial outward movement of the piston blades and with a moderate further outward movement of the piston blades in a travel to the mid-length of the work chamber with a corresponding progressive increase in effective piston area.

To provide an angular or oblique arrangement of the piston blades in the circular wall of their carrying head, whereby a gradual outward movement of the piston blades into the segmental work chamber of the engine is effectively attained and liability to binding on the operating cam surfaces avoided.

To provide a structural formation of the carrying head of the piston blades of the rotor adapted to afford convenient lubrication of the engine parts, and a compact and efficient association of said piston blades and their operating cam block, all as will hereinafter more fully appear.

In the accompanying drawings:—

Fig. 1.

Figure 3:
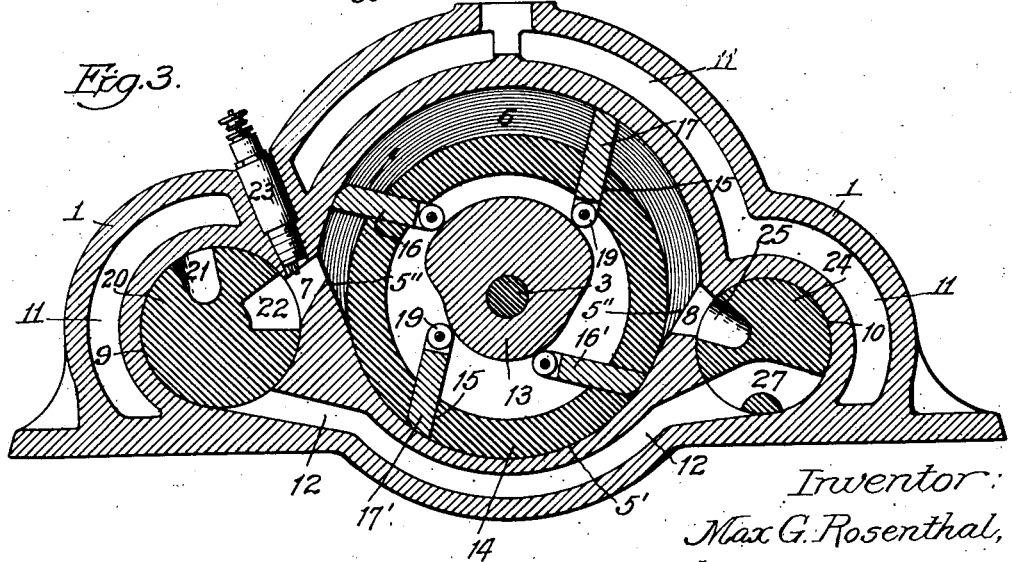

Figs. 3 and 3ª, are companion longitudinal sections illustrating the two main positions of the engine parts in the cycle of operation of the same.

Fig. 4, is a transverse section of the same, on line 4.—4. Fig. 3.

Fig. 5, is a detail perspective view of a pair of the piston blades in a separated condition.

Like reference numerals indicate like parts in the several views.

In the preferred form of the invention shown in the drawings, the stationary member or stator is formed by a main shell or section 1 having a removable end head or section 2, with said section formed with bearings for the power shaft 3 of the engine. Concentric with the power shaft 3, the sections 1 and 2 are formed with circular end bearing recesses 4, in which the ends of the hereinafter described carrying head of the piston blades are supported in a revoluble manner, leakage along the joints between the parts being prevented by the arrangement of packing rings 5 in one or the other of the parts.

Between the end bearing recesses 4 above described, the main section 1 of the stator is formed with an enlarged cavity for the reception for the middle portions of the carrying head and the piston blades of the rotary member or rotor of the engine. Said cavity has an irregular form, which in the preferred construction shown in Fig. 3 consists of an upper outwardly enlarged segmental portion constituting the work chamber 6 of the engine, with its outer curved wall on a curve, the radius of which is eccentric to the axis of the power shaft 3 for the purpose hereinafter set forth. Said cavity has a lower curved portion 5' concentric with the axis of the power shaft 3, and having adjacent relation to the carrying head of the piston blades heretofore referred to, with the respective ends of the portions just described connected together by inclined portions or surfaces 5'' in which are formed the respective inlet and outlet ports or passages 7 and 8 of the work chamber 6, and having communication with the valve chamber 9 and 10 formed in the casing section 1 aforesaid.

Adjacent to its peripheral portion, the main casing section 1, is cored out to provide a water cooling jacket or chamber 11 in adjacent relation to the work and valve chambers above described. And a material part of this improvement involves a compressed fuel storage passage 12 formed in the main section 1 and having communication with the respective valve chambers 9 and 10 aforesaid. When so desired the chamber 12 may be provided with the ordinary inlet and outlet check valves.

Surrounding the power shaft 3, a cam block 13 forms a fixed part of the main stator section 1, with its cam surface or perimeter having a complementary formation to that of the segmental outer wall of the work chamber 6, and inclined faces 5'' of the main cavity of said section, with a view to maintain the hereinafter described piston blades in contact with said surfaces in the operation of the engine. The rotary member or rotor of the engine consists of a cylindrical shell 14 mounted by an end hub portion 15 on the power shaft 3, with the opposite end of the shell open for the purpose hereinafter set forth, and in the construction shown the end portions of the shell 14 fit and turn in the end recesses 4 of the main stator section 1 and end leakage at the joints prevented by the packing rings 5 as heretofore described. The middle portion of shell or head 14 is formed with a series of obliquely arranged longitudinal guide slots 15 of a width equal to the width of the work chamber 6 of the stator and adapted to receive and guide the piston blades, now to be described.

The piston blades 16, 16' and 17, 17' are of the flat plate type connected together in pairs by transverse connecting yokes 18, so that each pair will have a spaced relation in parallel planes and corresponding with the oblique arrangement of the slots 15 in the shell or head 14 of the rotor and in which they fit and slide. In the construction shown each connecting yoke 18 is formed with an elongated slot 18' which encircles the power shaft 3 so as to have free movement with relation thereto, and the inner ends of the respective piston blades 16, 16' and 17, 17' are provided with bearing rollers 19 adapted for rolling contact with the peripheral cam surface of the cam block 13 aforesaid.

The eccentric formation of the work chamber 6 above described is adapted to provide a segmental form of work chamber of a gradually increasing area from both its inlet and its outlet ends to the middle or crown portion of the chamber, with a corresponding serial increase and decrease in the exposed area of the piston blades as they travel through the work chamber, and as so constructed and arranged are adapted to afford an efficient operation in the explosion and in the compression stages of the cycle of operations.

The valve member 20 preferably of the rocking type shown is arranged in the valve chamber 9 above described, and is formed with a curved duct or passage 21 adapted in one position of the valve to register the inlet part 7 of the work chamber 6 with a pipe or passage 21' extending to a carburetor or like source of uncompressed fuel supply. In adjacent relation to said duct or passage 21, the valve 20 is formed with a measuring chamber 22 adapted for alternate registry with the storage passage 12 and the inlet part 7 of the work chamber 6, to carry a supply of compressed fuel from one to the other.

In the construction shown, the inlet port or passage 7 of the work chamber 6 is provided with a spark plug 23, adapted to fire the charge of compressed fuel in the port 7 and chamber 22 at the proper periods in the operation of the engine.

A companion valve member 24, also of the rocking type, is arranged in valve chamber 10, aforesaid, and is formed with a curved duct or passage 25 adapted in one position of the valve to register the outlet port 8 of the work chamber 6 with the exhaust passage or pipe 26 of the engine. In adjacent relation to said duct or passage 25, the valve 24 is formed with an angular duct or passage 27 adapted to register said outlet port 8 with the compressed fuel passage 12 aforesaid.

Figure 1:
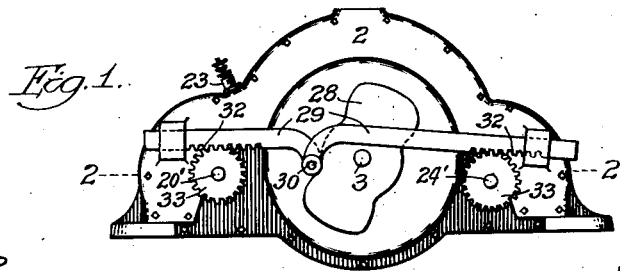
Fig. 1, is a side elevation of the engine, illustrating the valve operating mechanism.
Figure 2:
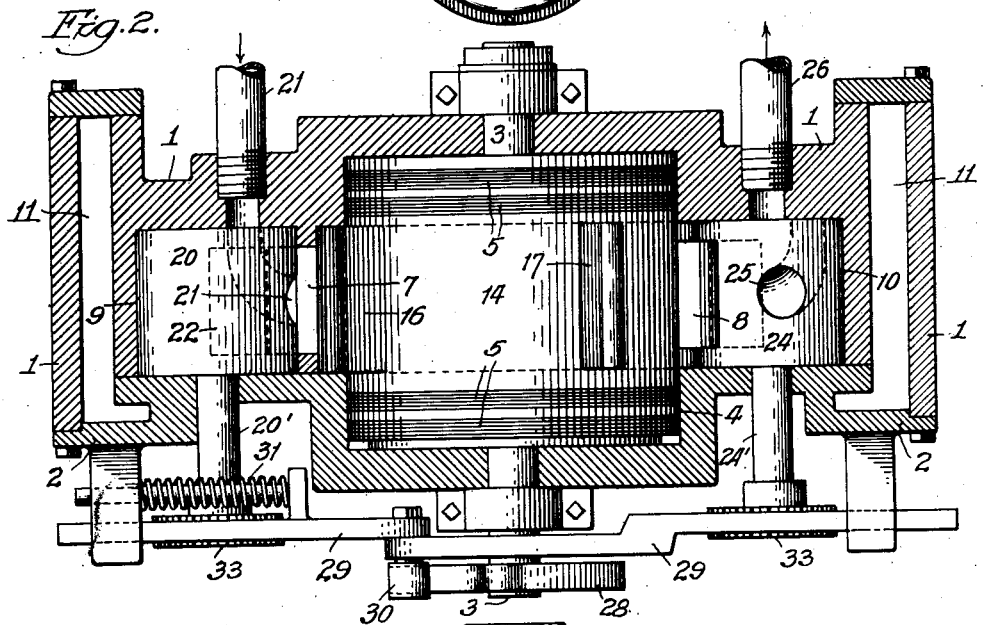
Fig. 2, is a top view of the engine parts, with the stator casing in section on line 2.—2.

The valves 20 and 24 are operated in unison with each other by an operating cam 28 carried by the power shaft 3 and having operative connection by any usual means with the stems or shafts 20' and 24' of the valves. In the construction shown in Figs. 1 and 2, a bar 29 is slidingly mounted at one side of the closure head 2 of the stator casing and receives positive motion in one direction from the cam 28, through a roller 30 mounted on the bar, and in the other direction by a spring 31. Near its respective ends the bar 29 is formed with gear teeth 32 having engagement with gear wheels 33 on the stems of the valves 20 and 24 to impart the required intermittent rocking movements to said valves.

A pipe passage 34 in a side wall of the stator casing 1 provides means for introducing from a suitable source of supply a fluid lubricant into the interior of the shell or head 14 of the rotor for lubricating the moving parts of the engine.

The operation of the engine is as follows:—

Assuming the parts to be in the position shown in Fig. 3ª, with the inlet port 7 of the work chamber 6 in communication with the source of uncompressed fuel supply through passage or pipe 21' and duct 21 of the valve member 20, and with the outlet port 8 of the work chamber in communication with the fuel storage passage 12 through the angular passage 27 of the valve member 24. With a rotation of the engine rotor, the piston blade 16 in its movement in the work chamber 6 acts to draw in a supply of uncompressed fuel into such chamber, while the piston blade 17 acts to compress and move a charge of fuel into the storage passage 12.

As said piston 17 nears the port 8 aforesaid, the valves 20 and 24 are reversed to the position illustrated in Fig. 3, bringing the curved passage 25 of the valve 24 into register with the outlet port 8 of the work chamber and with the exhaust passage or pipe 26 of the engine. At the same time the compressed fuel supply chamber 22 of the valves 20 is in register with the inlet port 7 of the work chamber. With the piston blade 17' moved past or nearly past the inlet port 7, the charge of compressed fuel in said port and in the chamber 22 is fired by the spark plug 23, to attain a power stroke of the engine, during which the preceding piston blade 16 acts to force the previously exploded fuel charge out of said work chamber 6 and into the exhaust passage or pipe 26.

With or near the end of the power stroke of the aforesaid piston blade 17', the valves 20 and 24 are again reversed to bring their ports and passages back to the position first described in the present operation, for a fresh cycle of the operations above set forth.

With the construction shown in the drawings, in which four piston blades 16, 16', 17 and 17' are used, the usual four cycles of operation of the engine will take place in a one half revolution of the rotor, and it is within the scope of the present invention to either reduce or increase the number of said piston blades as circumstances may require.

Where a number of the present engine units are coupled to a common power shaft, they will preferably have the progressive arrangement generally used in the multiple cylinder type of explosion engines. The described arrangement is quite common in rotary motor installations, so that no claim is made to such arrangement in the present case.

Having thus fully described my invention what I claim and desire to secure by Letters Patent:—

1. In a rotary motor of the type described, a rotor comprising a hollow revoluble head formed with a plurality of oblique guide slots extending longitudinally of the rotor head, piston blades moving in said slots and rigidly connected together in offset relation by a transverse member formed with an elongated slot to span the power shaft, a stator casing having a cavity formed with end bearing recesses for the ends of said revoluble head, with a segmental work chamber to receive the piston blades, and with inclined walls at the respective ends of said work chamber containing the inlet and outlet ports of said chamber, a cam block carried by the stator and having operative engagement with the inner ends of the piston blades, a passage for compressed fuel formed intermediate of the inlet and outlet ports of the work chamber, and valves operatively connected with the rotor for controlling the inlet and outlet ports of the work chamber.

2. In a rotary motor of the type described, a rotor comprising a hollow cylindrical head open at one end and having at its other end a carrying hub for attachment to a power shaft, the circular wall of the said head being formed with a plurality of oblique guide slots extending longitudinally of the rotor head, piston blades moving in said slots and rigidly connected together in offset relation by a transverse member formed with an elongated slot to span the power shaft, a stator casing having a cavity formed with end bearing recesses for the ends of said cylindrical head, with a segmental work chamber to receive the piston blades, and with inclined walls at the respective ends of the work chamber containing the inlet and outlet ports of said chamber, a cam block carried by the stator and having operative engagement with the inner ends of the piston blades, a passage for compressed fuel formed intermediate of the inlet and outlet ports of the work chamber, and valves operatively connected with the rotor for controlling the inlet and outlet ports of the work chamber.

3. In a rotary motor of the type described, a rotor comprising a hollow revoluble head formed with a plurality of oblique guide slots extending longitudinally of the rotor head, piston blades moving in said slots and rigidly connected together in offset and in crossed relation by transverse members formed with elongated slots to span the power shaft, a stator casing having a cavity formed with end bearing recesses for the ends of said revoluble head, with a segmental work chamber to receive the piston blades, and with inclined walls at the respective ends of the work chamber containing the inlet and outlet ports of said chamber, a cam block carried by the stator and having operative engagement with the inner ends of the piston blades, a passage for compressed fuel formed intermediate of the inlet and outlet ports of the work chamber, and valves operatively connected with the rotor for controlling the inlet and outlet ports of the work chamber.

4. In a rotary motor of the type described, a rotor comprising a hollow cylindrical head open at one end and having at its other end a carrying hub for attachment to a power shaft, the circular wall of said head being formed with a plurality of oblique guide slots extending longitudinally of the rotor head, piston blades moving in said slots and rigidly connected together in offset and crossed relation by transverse members formed with elongated slots to span the power shaft, a stator casing having a cavity formed with end bearing recesses for the ends of said cylindrical head, with a segmental work chamber to receive the piston blades, and with inclined walls at the respective ends of the work chamber containing the inlet and outlet ports of said chamber, a cam block carried by the stator and having operative engagement with the inner ends of the piston blades, a passage for compressed fuel formed intermediate of the inlet and outlet ports of the work chamber, and valves operatively connected with the rotor controlling the inlet and outlet ports of the work chamber.

5. In a rotary motor of the type described, a rotor comprising a hollow revoluble head formed with a plurality of oblique guide slots extending longitudinally of the rotor head, piston blades moving in said slots and rigidly connected together in offset relation by a transverse member formed with an elongated slot to span to the power shaft, a stator casing having a cavity formed with end bearing recesses for the ends of said revoluble head, with a segmental work chamber to receive the piston blades, and with inclined walls at the respective ends of said work chamber containing the inlet and outlet ports of said chamber the outer wall of the work chamber being on a curve eccentric to the axis of the rotor, a cam block carried by the stator and having operative engagement with the inner ends of the piston blades, a passage for compressed fuel formed intermediate of the inlet and outlet ports of the work chamber, and valves operatively connected with the rotor controlling the inlet and outlet ports of the work chamber.

6. In a rotary motor of the type described, a rotor comprising a hollow revoluble head formed with a plurality of oblique guide slots extending longitudinally of the rotor head, piston blades moving in said slots and rigidly connected together in offset relation by a transverse member formed with an elongated slot to span the power shaft, a stator casing having a cavity formed with end bearing recesses for the ends of said revoluble head, with a segmental work chamber to receive the piston blades, and with inclined walls at the respective ends of said work chamber containing the inlet and outlet ports of said chamber, a cam block carried by the stator and having operative engagement with the inner ends of the piston blades, individual valves associated with said inlet and outlet ports and having operative connection with the rotor, and a passage for compressed fuel formed intermediate of the inlet and outlet ports of the work chamber.

7. In a rotary motor of the type described, a rotor comprising a hollow revoluble head formed with a plurality of oblique guide slots extending longitudinally of the rotor head, piston blades moving in said slots and rigidly connected together in offset relation by a transverse member formed with an elongated slot to span the power shaft, a stator casing having a cavity formed with end bearing recesses for the ends of said revoluble head, with a segmental work chamber to receive the piston blades, and with inclined walls at the respective ends of said work chamber containing the inlet and outlet ports of said chamber, a cam block carried by the stator and having operative engagement with the inner ends of the piston blades, individual valves associated with said inlet and outlet ports and having operative connections with the rotor, and a passage for compressed fuel formed in the stator casing intermediate of said valves.

8. In a rotary motor of the type described, a rotor comprising a hollow revoluble head formed with a plurality of oblique guide slots extending longitudinally of the rotor head, piston blades moving in said slots and rigidly connected together in offset relation by a transverse member formed with an elongated slot to span the power shaft, a stator casing having a cavity formed with end bearing recesses for the ends of said cylindrical head, with a segmental work chamber to receive the piston blades, and with inclined walls at the respective ends of said work chamber containing the inlet and outlet ports of said chamber, a cam block carried by the stator and having operative engagement with the inner ends of the piston blades, individual valves associated with said inlet and outlet ports and having operative connections with the rotor, and a passage for compressed fuel formed intermediate of the inlet and outlet ports of the work chamber, one of said valves having a port adapted to register the work chamber with a source of uncompressed fuel supply and with a measuring cavity adapted to alternately register with the storage chamber and inlet of the work chamber, the other valve having a port adapted to register the outlet port of the work chamber with the exhaust passage of the engine, and an angular port adapted to register said outlet port of the work chamber with the storage chamber.

9. In a rotary motor of the type described, a rotor comprising a hollow revoluble head formed with a plurality of oblique guide slots extending longitudinally of the revoluble head, piston blades moving in said slots and fixedly connected together at their inner ends in offset relation by an intermediate member, a stator casing having a segmental work chamber to receive the piston blades and provided with inclined walls at the respective ends of said work chamber containing the inlet and outlet ports of said chamber, and a cam block carried by the stator and having operative engagement with the inner ends of the piston blades.

10. In a rotary motor of the type described, a rotor comprising a hollow revoluble head formed with a plurality of oblique guide slots extending longitudinally of the revoluble head, piston blades moving in said slots and fixedly connected together at their inner ends in pairs having a crossed relation by an intermediate member, a stator casing having a segmental work chamber to receive the piston blades and provided with inclined walls at the respective ends of said work chamber containing the inlet and outlet ports of said chamber, and a cam block carried by the stator and having operative engagement with the inner ends of the piston blades.

11. In a rotary motor of the type described, a rotor comprising a hollow revoluble head formed with a plurality of oblique guide slots extending longitudinally of the revoluble head, piston blades moving in said slots and fixedly connected together at their inner ends in offset relation by an intermediate member, a stator casing having a segmental work chamber to receive the piston blades and provided with inclined walls at the respective ends of said work chamber containing the inlet and outlet ports of said chamber, and a cam block carried by the stator and having operative engagement with the inner ends of the piston blades, the outer wall surface of said work chamber being formed on a curve eccentric to the axis of the rotor.

12. In a rotary motor of the type described, a rotor comprising a hollow revoluble head formed with a plurality of oblique guide slots extending longitudinally of the revoluble head, piston blades moving in said slots and fixedly connected together at their inner ends in pairs having a crossed relation by intermediate members, a stator casing having a segmental work chamber to receive the piston blades and provided with inclined walls at the respective ends of said work chamber containing the inlet and outlet ports of said chamber, and a cam block carried by the stator and having operative engagement with the inner ends of the piston blades, the outer wall surface of said work chamber being formed on a curve eccentric to the axis of the rotor.

13. In a rotary motor of the type described, a rotor comprising a hollow revoluble head formed with a plurality of oblique guide slots extending longitudinally of the revoluble head, piston blades moving in said slots and fixedly connected together at their inner ends in offset relation by an intermediate member, a stator casing having a cavity formed with end bearing recesses for the ends of said head, with a segmental work chamber to receive the piston blades and with inclined walls at the respective ends of said work chamber containing the inlet and outlet ports of said chamber, and a cam block carried by the stator and having operative engagement with the inner ends of the piston blades.

14. In a rotary motor of the type described, a rotor comprising a hollow revoluble head formed with a plurality of oblique guide slots extending longitudinally of the revoluble head, piston blades moving in said slots and fixedly connected together at their inner ends in pairs having a crossed relation by intermediate members, a stator casing having a cavity formed with end bearing recesses for the ends of the revoluble head, with a segmental work chamber to receive said piston blades and with inclined walls at the respective ends of said work chamber containing the inlet and outlet ports of said chamber, and a cam block carried by the stator and having operative engagement with the inner end of the piston blades.

Signed at Chicago, Illinois, this 27th day of August, 1923.

MAX G. ROSENTHAL.